UNITED STATES PATENT OFFICE.

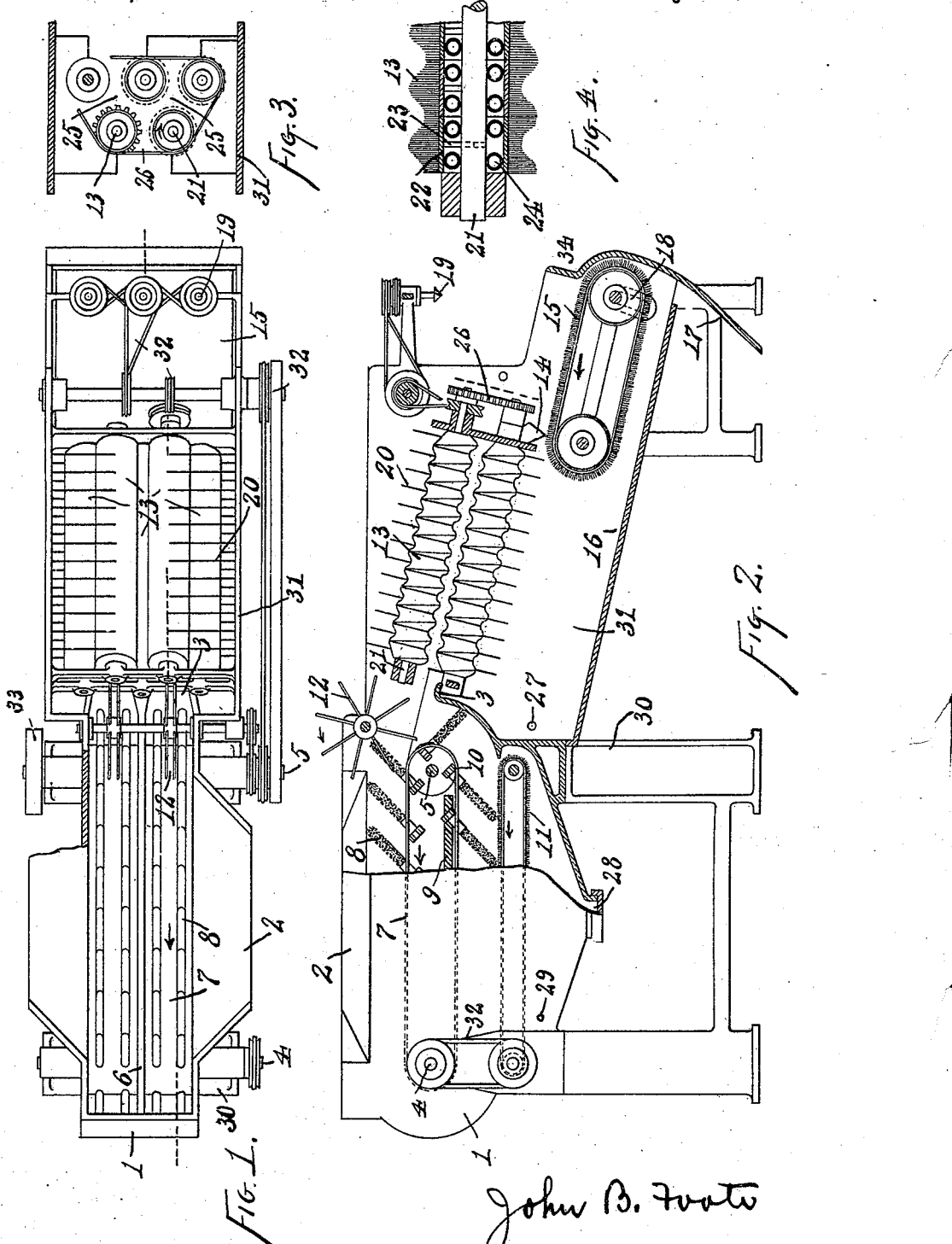

JOHN B. FOOTE, OF HAMILTON, OHIO.

VEGETABLE-PEELING MACHINE.

SPECIFICATION forming part of Letters Patent No. 501,613, dated July 18, 1893.

Application filed February 25, 1893. Serial No. 463,729. (No model.)

*To all whom it may concern:*

Be it known that I, JOHN B. FOOTE, of Hamilton, Butler county, Ohio, have invented certain new and useful Improvements in Fruit and Vegetable Peeling Machines, of which the following is a specification.

This invention pertains to a machine for peeling that class of fruits and vegetables in which the peeling may be skinned off when scalded, as for instance, in the case of tomatoes.

My invention will be readily understood from the following description taken in connection with the accompanying drawings, in which—

Figure 1, is a plan of a machine exemplifying my invention; Fig. 2, a side elevation of the same, parts appearing in vertical section; Fig. 3, an end view of the roller-brushes; and Fig. 4, a diametrical section of a portion of one of the roller-brushes.

In the drawings, 1 indicates a horizontal tank adapted to contain scalding water: 2, a hopper board at the top of each side of the tank, the machine being illustrated as a double machine designed to be supplied by two attendants, or groups of attendants, one at each side of the tank: 3, the horizontal front ledge of the tank, being also the height at which the scalding water in the tank will be carried: 4, a shaft disposed horizontally across the head of the tank and provided with a roller to carry an endless belt in the tank: 5, a similar shaft across the tail of the tank, these shafts to be revolved by power in any appropriate manner: 6, a longitudinal vertical partition in the tank forming the tank into a double tank, the presence of this partition being incidental to the fact that the machine is designed as a double machine: 7, endless belts operated by the rollers on shafts 4 and 5, the width of these belts being sufficient to reach from the side walls of the tank inward to the partition 6: 8, a series of rotary spindle brushes carried by the belts 7, these brushes projecting diagonally outward from the belts and being arranged in pairs, one brush of each pair being arranged near the wall of the tank and one near the partition 6, the distance between the two brushes of a pair being less than the average diameter of the tomatoes to be dealt with: 9, racks provided with diagonal teeth and supported within the tank over the lower portion of the belt 7, the toothed faces of these racks presenting themselves near the path of travel of the inner ends of the spindles of the brushes 8: 10, a pinion on the inner end of each spindle brush 8, these pinions gearing with racks 9, it being understood that the brush-spindles are journaled in bearings secured upon the belts so that as the belts travel in the direction indicated by the arrows the pinions will, as they move forward, engage with the racks and thus cause the spindle brushes to rotate, the rolls on shafts 4 and 5, over which the belts travel, having pockets to permit of the passage of the pinions as they pass over the rolls: 11, endless brush belts forming floors in the two portions of the tanks below the belts 7, and at such distance below the belts as to be just reached by the lower ends of the spindle brushes 8: 12, armed spiders journaled over the forward ends of the belts 7, the arms of these spiders reaching down in between the spindle-brushes 8, these spiders being revolved by power: 13, a group of five roller brushes arranged parallel with each other and with their axes sloping downwardly, there being a lower row of three brushes with their upper ends about even with tank ledge 3, and a row of two brushes above the lower row, as seen in Fig. 3, these roller brushes being journaled in proper supports in the forward part of the machine, the brushes being formed with radial bristles presenting the general aspect of cylinders with helical screw like grooves, each cylinder being therefore virtually a screw-brush, these brushes all turning in the same direction: 14, spouts at the tail of the roller brushes, leading from the two channels formed between the upper and lower brushes: 15, a belt brush at the tail of the machine, with its head end under the spouts 14, the upper surface of this belt brush inclining downwardly, the belt brush being carried on suitable rollers driven by power: 16, a floor disposed below the roller brushes and belt brush 15 and sloping downwardly toward the tail of the machine: 17, a discharge board for peelings, disposed somewhat beyond the tail of the floor 16: 18, slots in the support of the tail-roller of belt brush 15 by means of which the slope of that brush may be altered: 19, vertical boring-spindles journaled over the belt brush 15, and driven by power, these spindles being cutters adapted, when the eye of the tomato is presented to them, to bore into that eye and remove any peeling that might be remaining there: 20, wires with their heels fixed to the sides of the machine and projecting inwardly to and against the roller brushes 13 and adapted to serve as strippers for those brushes: 21, the shafts of the roller brushes 13: 22, the hubs or shells of the roller brushes 13, these roller brushes being made in short independent sections each with its shell hub, strung upon their shafts 21, the shell hubs being considerably larger than the shafts: 23, a pin projecting from each shell hub 22 very loosely into a radial hole through the shaft: 24, hollow rings of rubber tubing encircling shafts 21 within the shell hubs 22 and forming springs tending to hold the shell hubs concentric with their shafts while permitting of the shell hubs yielding toward their shafts: 25, the longitudinal channels formed in the space below each of the upper brushes 13 and between the brushes of the lower roll: 26, endless chain and sprocket arrangement at the tail end of the roller brushes 13 exemplifying means for driving all the roller brushes simultaneously: 27, pipe for admitting water over the floor 16 to cause peelings to flow down that floor: 28, discharge opening in the base of tank 1: 29, pipe for keeping tank 21 supplied with scalding water: 30, the general framing of the machine: 31, side walls of the machine forward of the tank, walling in the roller brushes and the belt brush 15: 32, exemplifying transmitting mechanism of an obvious character, for transmitting motion between the various parts of the machine: and 33, the main driving pulley of the machine, from which the machine is to be driven by belt from any suitable source of power.

Tomatoes are handled by the attendants at the hopper-boards 2, the tomatoes going down onto the belts 7 between the spindle brushes 8 which carry the tomatoes rearwardly and then downward into the water of the tank and then forward. As the spindle brushes move forward they revolve rapidly and the tomatoes become subjected to the action of the spindle-brushes and the belt brush 11, which loosens and removes much of the peeling, such peeling as is thus removed going to the bottom of the tank where it may be occasionally removed through opening 28. The spindle brushes finally carry the tomatoes up to ledge 3 where they roll into the spaces 25 between the roller brushes, the spiders 27 pushing from the spindle brushes any tomatoes which are disinclined to roll. The tomatoes received within the channels 25 at the heads of the roller brushes become screwed forward in these channels and acted upon by the roller brushes, effectually removing the peeling, much of which falls directly to floor 16, the wires 20 serving to strip the peeling from the roller brushes, and the sections of the roller brushes yielding upon their shafts so as to accommodate themselves to various sized tomatoes and act on them with yielding pressure in addition to the yielding of the bristles. The tomatoes, upon reaching the tail end of the roller brushes go through spouts 14 to belt brush 15 and roll down that brush against the tail-board 34 of the machine, the belt-brush rolling the tomatoes and removing any peeling that has been carried with them and carrying it rearwardly and dropping it upon floor 16 where it washes down to the discharge 17. This leaves against the tail-board 34 tomatoes fully peeled except as to what peeling may remain within the eyes of the tomatoes where the brushes cannot have reached. Tomatoes fully peeled are removed from belt brush 15 by an attendant at the tail of the machine and placed in a proper receptacle and tomatoes which need further peeling at the eye are taken in hand and subjected to the action of boring spindles 19.

I claim as my invention—

1. In a peeling machine, the combination, substantially as set forth, of a tank, a traveling surface therein, as an endless belt, spindle-brushes projecting in pairs therefrom, and mechanism for advancing the traveling surface and rotating the spindle-brushes carried thereby.

2. The combination, substantially as set forth, of a tank, a traveling belt brush therein, a series of pairs of spindle-brushes with their ends contiguous to said belt brush, and mechanism for moving said belt brush in one direction and said series of spindle-brushes in the other direction and simultaneously rotating said spindle brushes.

3. The combination, substantially as set forth, of a tank, a traveling series of pairs of rotating spindle-brushes therein, and a floor surface over which the lower ends of said spindle brushes may travel.

4. The combination, substantially as set forth, of a horizontally disposed belt, a series of pairs of rotary spindle-brushes carried thereby and projecting from the outer surface of the belt diagonally, a tank, and mechanism for supporting and moving said belt and brushes in said tank.

5. The combination, substantially as set forth, of a tank having a discharge ledge at one end, a pair of shafts disposed across said tank, an endless belt carried by rollers upon said shafts, and a series of pairs of rotary spindle-brushes carried by said belts and sweeping with their ends the end wall of said tank to said discharge ledge.

6. The combination, substantially as set forth, with the traveling series of rotary spindle brushes, of a rotary spider with its arms projecting between the spindle brushes of the pairs.

7. The combination, substantially as set forth, of a group of roller brushes arranged to form a longitudinal channel between the brushes, and having their entire surfaces armed with brushes provided with helical grooves an outlet spout at the tail end of said channel, and mechanism for turning said roller brushes.

8. The combination, substantially as set forth, of a multiplicity of roller brushes arranged parallel with each other and having their entire surfaces armed with brushes provided with helical grooves.

9. The combination, substantially as set forth, of a brush shaft, and a series of brush sections arranged thereon and to be driven thereby and having hub-holes larger than the shaft.

10. The combination, substantially as set forth, of a brush shaft, tubes of elastic material surrounding the shaft, and a series of brushes with their hubs encircling said tubes.

11. The combination, substantially as set forth, of an inclined brush belt, having its top surface moving up the incline and a tail board projecting upward from the lower end of the upper surface of said belt brush.

12. The combination, substantially as set forth, of a group of roller brushes arranged to form a channel between them, and a belt brush disposed with its upper surface below the discharge end of said channel.

13. The combination, substantially as set forth, of a tank provided with a discharge ledge, a series of pairs of rotating spindle-brushes traveling therein, a group of roller brushes arranged parallel to form a channel with its receiving end at said discharge ledge, and a belt brush with its upper surface arranged below the discharge end of said channel.

14. The combination, substantially as set forth, with a series of brushes arranged to operate upon vegetables and discharge the same, and a boring spindle arranged near the discharge point of said brushes.

15. The combination, substantially as set forth, of a tank, a series of spindle-brushes therein, a belt brush in the tank below the spindle-brushes, a group of roller-brushes beyond the tank, and a belt brush beyond the discharge point of the roller brushes.

16. The combination of a traveling surface, as an endless belt, spindle brushes projecting in pairs therefrom, disposed so as to form a longitudinal channel between them, and mechanism for advancing the traveling surface and rotating the spindle brushes carried thereby.

17. The combination of a traveling belt brush, a series of pairs of spindle brushes with their ends contiguous to the said belt brush and disposed so as to form a longitudinal channel between them, and mechanism for moving said belt brush in one direction and said series of spindle brushes in the other direction, and simultaneously rotating said spindle brushes.

18. The combination of a traveling series of pairs of rotating spindle brushes arranged to form a longitudinal channel between them, and a floor surface over which the lower ends of said spindle brushes may travel.

JOHN B. FOOTE.

Witnesses:
J. W. SEE,
E. A. BELDEN.